United States Patent
Ettiene

(10) Patent No.: US 11,138,339 B2
(45) Date of Patent: Oct. 5, 2021

(54) SYSTEM AND METHOD OF CONTROLLING CONTACT INFORMATION

(71) Applicant: Kernan Ettiene, Orange, NJ (US)

(72) Inventor: Kernan Ettiene, Orange, NJ (US)

( * ) Notice: Subject to any disclaimer, the term of this patent is extended or adjusted under 35 U.S.C. 154(b) by 216 days.

(21) Appl. No.: 16/656,057

(22) Filed: Oct. 17, 2019

(65) Prior Publication Data

US 2020/0125763 A1    Apr. 23, 2020

Related U.S. Application Data

(60) Provisional application No. 62/747,269, filed on Oct. 18, 2018.

(51) Int. Cl.
*G06F 21/62* (2013.01)

(52) U.S. Cl.
CPC .. *G06F 21/6254* (2013.01); *G06F 2221/2115* (2013.01)

(58) Field of Classification Search
CPC ......... G06F 21/6254; G06F 2221/2115; G06F 2221/2117
See application file for complete search history.

(56) References Cited

U.S. PATENT DOCUMENTS

2016/0037331 A1\* 2/2016 Vernon ............... G06Q 10/107 455/414.1
2016/0344867 A1\* 11/2016 Krishnaswamy ....... H04M 3/53

\* cited by examiner

*Primary Examiner* — Minh Dinh
(74) *Attorney, Agent, or Firm* — Dunlap Bennett & Ludwig, PLLC

(57) ABSTRACT

A web server accessible by computing devices over a network includes at least one processing element including a processor coupled to a memory, and at least one communications interface. The processing element executes instructions, such as those making up the software program, to allow users to exchange contacts in a controlled manner. A requestor sends a request for a contact information of a requestee over the web server. If the requestee accepts, the web server encrypts contact information of the requestee to a code. The code is associated with the requestor user account so that the code is restricted for use only by the requestor to contact the requestee over a communications portal of the web server.

8 Claims, 2 Drawing Sheets

SYSTEM AND METHOD OF CONTROLLING CONTACT INFORMATION

CROSS-REFERENCE TO RELATED APPLICATION

This application claims the benefit of priority of U.S. provisional application No. 62/747,269, filed Oct. 18, 2018, the contents of which are herein incorporated by reference.

BACKGROUND OF THE INVENTION

The present invention relates to sharing contact information and, more particularly, to a system and method of controlling the dissemination of contact information.

Currently, to contact an individual, one must provide contact information, such as an email, telephone number, physical address, screenname, and the like. Once the contact information has been shared, the contact information can be reshared with others without the individual's control. While the individual may block certain contactors, this method is very inefficient and may be circumvented by contacting the individual by other means such as a different account or device.

As can be seen, there is a need for a system and method of controlling the dissemination of contact information.

SUMMARY OF THE INVENTION

In one aspect of the present invention, a method of controlling contact information comprising: storing a plurality of user accounts at a web server, each of the plurality of user accounts accessible by a corresponding user via corresponding user credentials; receiving, at the web server, a request from a first user for the contact information of a second user; and receiving, at the web server, a confirmation from the second user to share the contact information of the second user with the first user, wherein the web server encrypts the contact information to a code, associates the code with the second user so that the code is restricted for use only by the first user to contact the second user over a communications portal of the web server, and sends the code to the first user.

In another aspect of the present invention, a system for controlling contact information comprises: a web server comprising at least one processing element comprising a processor coupled to a memory; and at least one communications interface, said at least one processing element being configured to: store a plurality of user accounts, each of the plurality of user accounts accessible by a corresponding user via corresponding user credentials; receive a request from a first user for a contact information of a second user; receive a confirmation from the second user to share the contact information of the second user with the first user; encrypt the contact information to a code, associate the code with the first user so that the code is restricted for use only by the first user to contact the second user over a communications portal of the web server, and send the code to the first user.

In another aspect of the present invention, a system for controlling contact information comprises: a web server comprising at least one processing element comprising a processor coupled to a memory; and at least one communications interface, said at least one processing element being configured to: store a plurality of user accounts, each of the plurality of user accounts accessible by a corresponding user via corresponding user credentials on an electronic device; receive a request from a first user for the contact information of the second user; receive a confirmation from the second user to share the contact information of the second user with the first user; selects one of the pre assigned contact codes from the second user account from a plurality of contact codes which was assigned to the second user's account, allows the second user to add restrictions to the code, associates the code to the first user account making it impossible to use that code from any other account, and then sends the unique code to the first user; the first user then uses the unique code received from the second user to contact the second user.

These and other features, aspects and advantages of the present invention will become better understood with reference to the following drawings, description and claims.

DETAILED DESCRIPTION OF THE INVENTION

Figure 1:
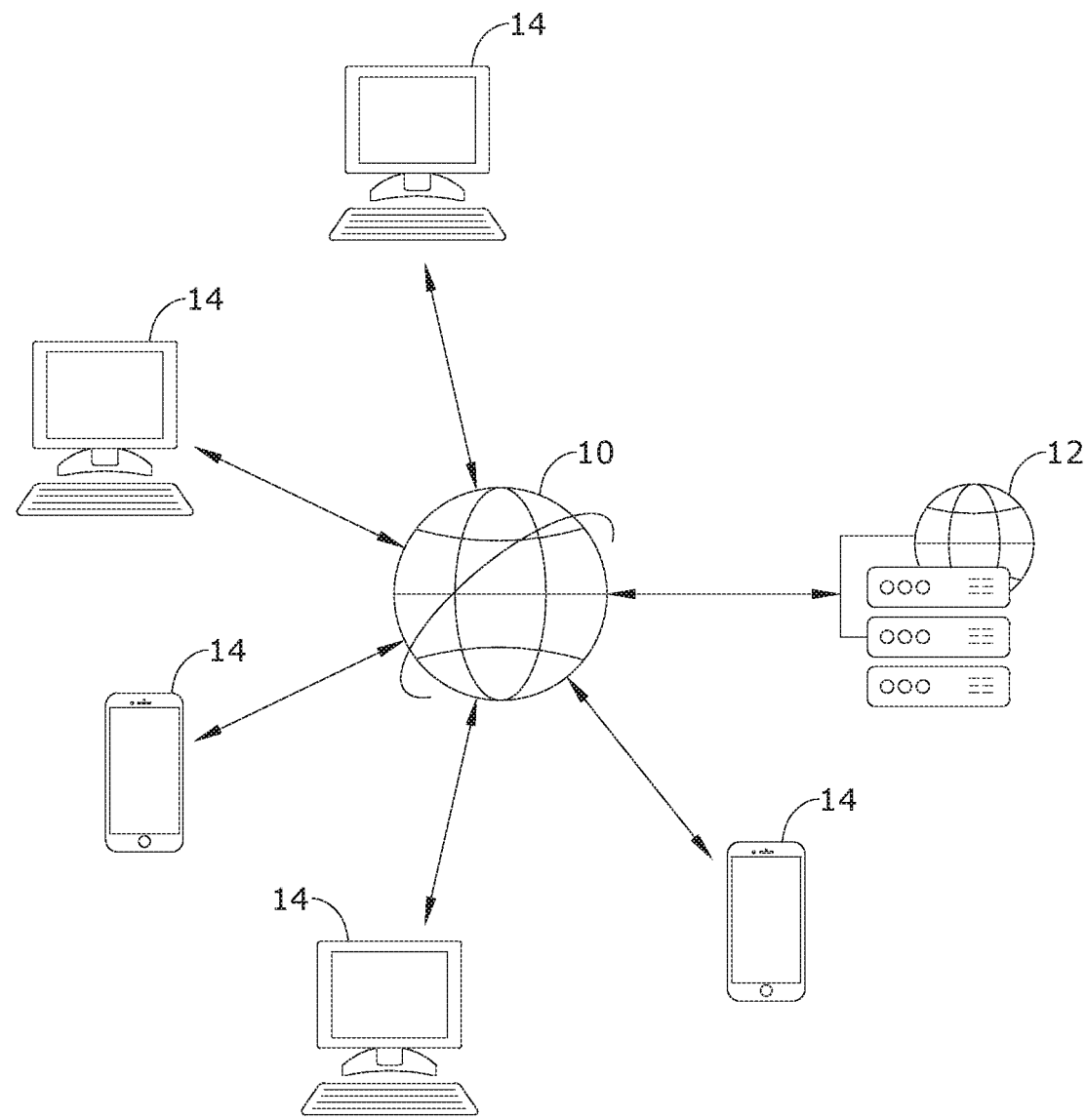
FIG. 1 is a schematic view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a software that allows an owner of contact information, (the contacted), a more efficient and effective way of managing and controlling the sharing of, and access to, their contact information by those, (the contactors), who wish to use that contact information to contact them (the contacted). The present invention allows each contacted individual to provide each of his/her contactors with a different and unique code, which can only be used from the contactors unique account which the code was generated for, to contact the contacted individual. The code may be linked to contact information of the contacted, such as e-mail, telephone numbers, and the like.

Since only the contacted can generate and authorize the dissemination of the codes used to contact them, only those codes which have been authorized by the contacted work when attempting to contact the contacted. The fact that each code only works from the unique account which it was generated for means that codes are not be able to be shared, copied or used from one account to the next.

The present invention may include the following process steps. Each contacted and contactor registers an account with user credentials, i.e. a username and password. Each account has a limited messaging feature which allows users to request and receive contact codes from other users. The messaging feature comprises of fields for, but not limited to, who's making the request, why, and whether a mutual friend endorses the request. Also, codes could be transferred in person, in writing, via mutual acquaintances and the like. Each account has a code generator whose purpose is to generate codes unique to its account. A batch of codes could also be assigned to each account for dissemination. The code generated by each accounts code generator or a code from the batch of codes assigned to the contacted account is used by the contactors to contact the accounts which generated or provided the code. The codes may be customizable. These customizations may include, but are not limited to, restrictions on the frequency with which they could be used, the times of day when they could be used, whether the contactor is allowed to recommend other contactors to the contacted for an authorized code, and whether the code allows both parties to contact each other or whether only one party is allowed to contact the other. Each account has a registry where received codes are stored. At the request of the contactor these codes are retrieved and used to contact the contacted.

To use the present invention, the contactor requests a code from the contacted, the contacted offers the contactor a code or a mutual acquaintance requests a code from the contacted on behalf of the contactor. The contacted may enter the contactors username into his/her accounts code generator or allow a code to be picked from those which were previously assigned and authorizes his/her account code generator to produce, customize and send the code to the contactors account. Upon receipt of the unique code from the contacted the contactor accesses his/her account, retrieves the code from his/her accounts registry and uses that code to contact the contacted from his/her account.

Referring to FIG. 1, the present invention includes a web server 12 accessible by computing devices 14 over a network 10, such as the Internet. The web server 12 includes at least one processing element including a processor coupled to a memory, and at least one communications interface. The processing element executes instructions, such as those making up the software program, to allow users to exchange contacts in a controlled manner.

A plurality of users may access the web server 12 using the computing devices 14 over the network 10. The plurality of users may each create user accounts. The user accounts are stored on the memory of the web server 12. Each of the plurality of user accounts is accessible by a corresponding user via corresponding user credentials. Each of the user accounts may include identifying information and contact information of the corresponding user.

As mentioned above, the web server 12 facilitates a controlled contact between users. For example, a first user may send a request for a contact information of a second user on the web server 12. The second user may be notified by the web server 12 and may accept or deny the request from the first user. If the second user accepts the request, the web server 12 encrypts contact information of the second user to a unique code. The code is associated with the first user account so that the code is restricted for use only by the first user to contact the second user over a communications portal of the web server. The code is then sent to the first user and saved to their account. The first user may enter the code in the communications portal of the web server 12 to initiate a communication with the second user. The communications portal may include a text-based communications portal, an audio-based communications portal, or an audio and video-based communications portal.

In certain embodiments, restrictions may be added to the code to restrict contact. For example, after the second user has accepted the request of the first user, the web server 12 may prompt the second user to select from a list of restrictions. The list of restrictions may include, but is not limited, to a frequency in which the code is allowed to be used by the first user, a time of day the code is allowed to be used by the first user, and whether the first user is allowed to recommend other users of the plurality of users to request the contact information of the first user. If the second user selects one or more of the restrictions, the restrictions are applied to the code, thereby restricting the use of the code by the first user.

If the second user selected a specific time in which the first user may contact the second user, the code does not allow the first user to establish a communication with the second user outside of the specified time.

The software of the present invention may be run on computing systems. The computing systems include the computing devices 14 and/or the web server 12. The computing devices 14 may include a laptop, desktop, or smart device, such as a tablet and smart phone. The computing systems each include at least the processor and the memory. The computing systems may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating devices.

In particular embodiments, the computing systems include a processor, memory, a user interface, and a communication interface. In particular embodiments, the processor includes hardware for executing instructions, such as those making up the software program. The memory includes main memory for storing instructions such as computer program(s) for the processor to execute, or data for processor to operate on. The memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for user communication with the computing systems. As an example and not by way of limitation, the user interface may include a keyboard, keypad, microphone, monitor, mouse, printer, scanner, speaker, still camera, stylus, tablet, touchscreen, trackball, video camera, another user interface or a combination of two or more of these.

The communication interface includes hardware, software, or both providing one or more interfaces for communication (e.g., packet-based communication) between the computing systems over one or more networks. As an example, and not by way of limitation, communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

Figure 2:
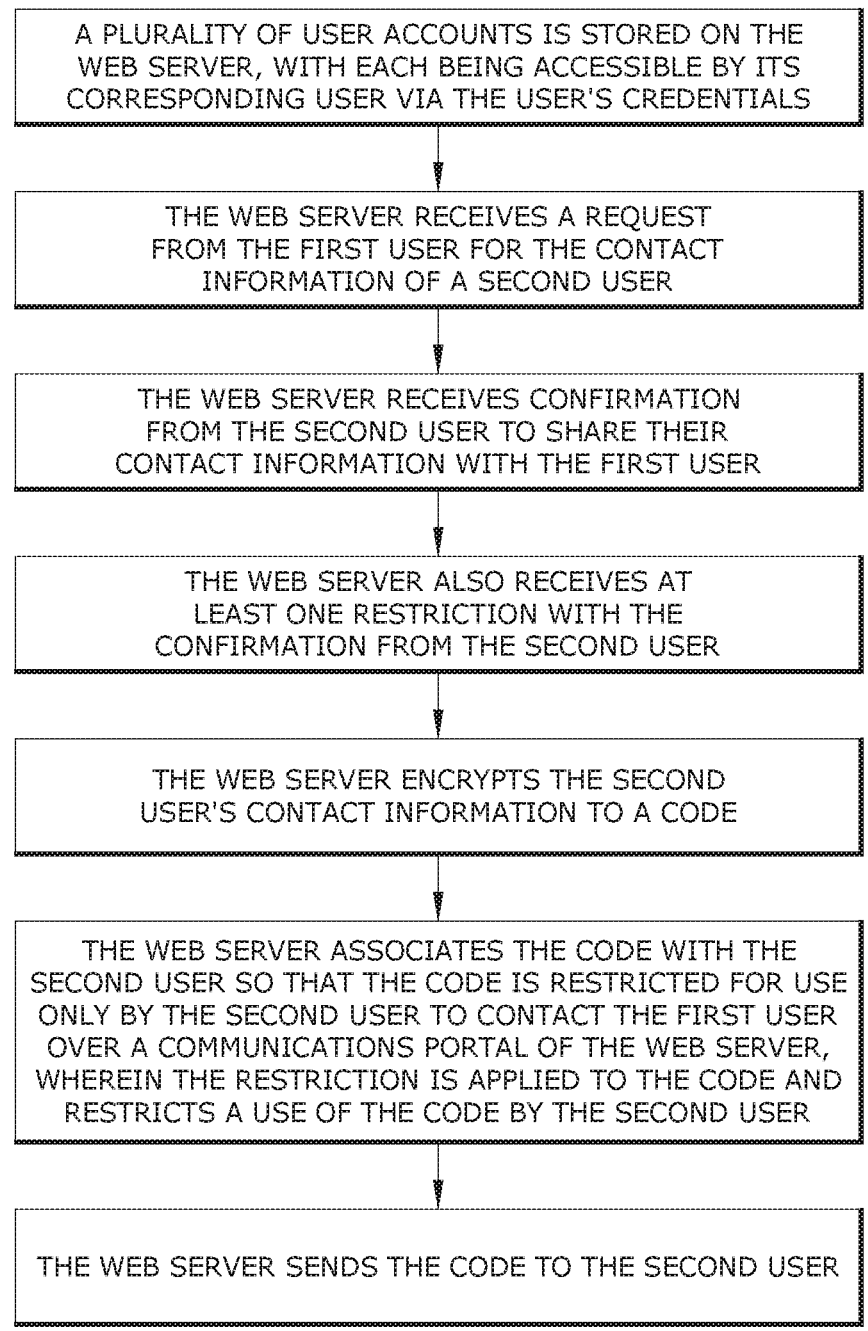
FIG. 2 is a flow chart of an embodiment of the present invention.

Referring to FIG. 2, the present invention includes a method of controlling contact information. The method includes: storing a plurality of user accounts at a web server, each of the plurality of user accounts accessible by a corresponding user via corresponding user credentials; receiving, at the web server, a request from a first user for a contact information of a second user; receiving, at the web server, a confirmation from the second user to share the contact information of the second user with the first user; receiving at least one restriction with the confirmation from the second user; encrypting, by the web server, the contact information to a code; associating, by the web server, the code with the second user so that the code is restricted for use only by the second user to contact the first user over a communications portal of the web server, wherein the restriction is applied to the code and restricts a use of the code by the second user; and sending, by the web server, the code to the second user It should be understood, of course, that the foregoing relates to exemplary embodiments of the invention and that modifications may be made without departing from the spirit and scope of the invention as set forth in the following claims.

What is claimed is:

1. A method of controlling contact information comprising:
    storing a plurality of user accounts at a web server, each of the plurality of user accounts accessible by a corresponding user via corresponding user credentials;
    receiving, at the web server, a request from a first user for a contact information of a second user; and
    receiving, at the web server, a confirmation from the second user to share the contact information of the second user with the first user, wherein the web server encrypts the contact information to a code,
    associates the code with the second user so that the code is restricted for use only by the second user to contact the first user over a communications portal of the web server, and
    sends the code to the second user.

2. The method of claim 1, wherein the communications portal comprises at least one of a text-based communications portal, an audio based communications portal, and an audio and video based communications portal.

3. The method of claim 1, further comprising the step of:
    receiving, at the web server, at least one restriction with the confirmation from the second user, wherein the restriction is applied to the code and restricts a use of the code by the second user.

4. The method of claim 3, wherein the at least one restriction comprises at least one of a frequency in which the code is allowed to be used by the second user, a time of day the code is allowed to be used by the second user, and whether the second user is allowed to recommend other users of the plurality of users to request to contact the first user.

5. A system for controlling contact information comprising:
    a web server comprising at least one processing element comprising a processor coupled to a memory; and at least one communications interface, said at least one processing element being configured to:
        store a plurality of user accounts, each of the plurality of user accounts accessible by a corresponding user via corresponding user credentials;
        receive a request from a first user for a contact information of a second user;
        receive a confirmation from the second user to share the contact information of the second user with the first user;
        encrypt the contact information to a code,
        associate the code with the second user so that the code is restricted for use only by the second user to contact the first user over a communications portal of the web server, and
        send the code to the second user.

6. The system of claim 5, wherein the communications portal comprises is at least one of a text-based communications portal, an audio based communications portal, and an audio and video based communications portal.

7. The system of claim 5, wherein the processing element is further configured to:
    receive at least one restriction with the confirmation from the second user; and
    apply the at least one restriction to the code and thereby restricting use of the code by the second user.

8. The system of claim 7, wherein the at least one restriction comprises at least one of a frequency in which the code is allowed to be used by the second user, a time of day the code is allowed to be used by the second user, and whether the second user is allowed to recommend other users of the plurality of users to request to contact the first user.

* * * * *